United States Patent
Toba

Patent Number: 6,144,414
Date of Patent: Nov. 7, 2000

[54] IMAGE RECORDING AND REPRODUCTION APPARATUS

[75] Inventor: Akira Toba, Osaka, Japan

[73] Assignee: Sanyo Electric Co., LTD, Japan

[21] Appl. No.: 09/013,661

[22] Filed: Jan. 26, 1998

[30] Foreign Application Priority Data

Feb. 26, 1997 [JP] Japan ................................. 9-042357

[51] Int. Cl.⁷ .................................................. H04N 5/445
[52] U.S. Cl. ........................ 348/564; 348/554; 348/600; 348/589; 348/239; 345/116; 345/141; 345/467; 345/194
[58] Field of Search ................................ 348/569, 563, 348/564, 589, 600, 239, 555, 554; 345/141, 115, 116, 194, 467, 468, 469, 25, 26; H04N 5/445

[56] References Cited

U.S. PATENT DOCUMENTS

| | | | |
|---|---|---|---|
| 5,563,663 | 10/1996 | Guillon | 348/653 |
| 5,623,316 | 4/1997 | Naito et al. | 348/569 |
| 5,774,189 | 6/1998 | Ishii et al. | 348/563 |

*Primary Examiner*—Michael H. Lee
*Attorney, Agent, or Firm*—Michaelson & Wallace; Peter L. Michaelson

[57] ABSTRACT

In a digital still camera, a character font readout control circuit (20) has the character constituted by 46 lines read out from a font memory (23) into a display memory (8) when the monitor device complies with the NTSC system, and the number of lines of the character increased to 54 lines and then written into the display memory (8) when the monitor device complies with the PAL system. The memory capacity can be reduced since the font for only the NTSC system, and not the PAL system, needs to be stored.

2 Claims, 9 Drawing Sheets

IMAGE RECORDING AND REPRODUCTION APPARATUS

BACKGROUND OF THE INVENTION

1. Field of the Invention

The present invention relates to image recording and reproduction apparatuses, and more particularly, to an image recording and reproduction apparatus that can operate in a first display mode for displaying a first display screen in which an image is constituted by a first number of horizontal scanning lines and a second display mode for displaying a second display screen in which an image is constituted by a second greater number of horizontal scanning lines.

2. Description of the Background Art

A digital still camera is an electronic image recording and reproduction apparatus that can record and store image data value obtained from a solid state image sensing device such as a CCD onto a single recording medium such as a semiconductor memory and view a reproduced image through a display device such as a liquid crystal display device (LCD). By connecting the digital still camera to a monitor device, the reproduced image can also be viewed through the monitor device.

Figure 4:
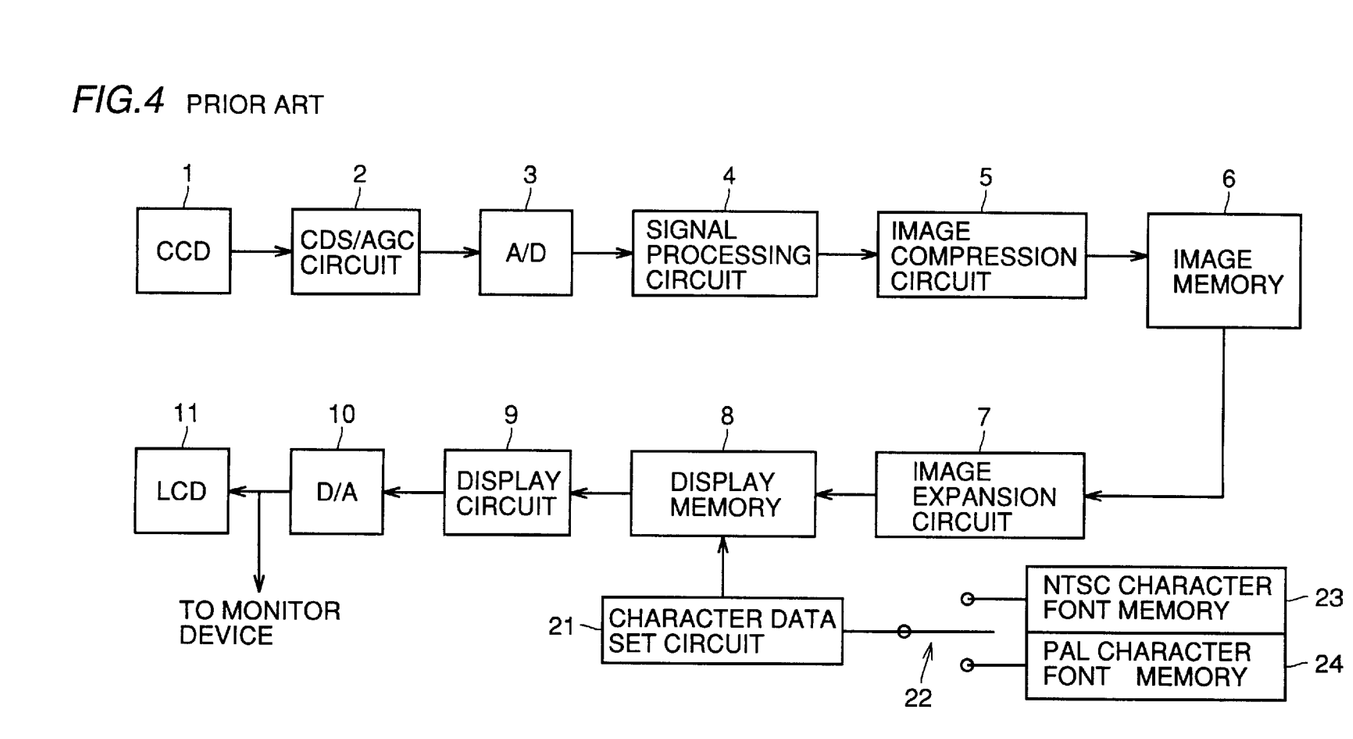
FIG. 4 is a circuit block diagram showing a structure of a conventional digital still camera.

FIG. 4 is a circuit block diagram showing a structure of a conventional digital still camera. Referring to FIG. 4, a conventional still camera includes a CCD 1, a CDS/AGC circuit 2, an A/D converter 3, a signal processing circuit 4, an image compression circuit 5 and an image memory 6. The still camera also includes an image expansion circuit 7, a display memory 8, a display circuit 9, an D/A converter 10, an LCD 11, a character data set circuit 21, a switch 22, an NTSC character font memory 23, and a PAL character font memory 24. D/A converter 10 can be connected to an external monitor device by means of a connector and the like.

The overall operation of this still camera will be described briefly hereinafter. Incident light through a lens not shown is converted into an analog image signal by CCD 1. The signal output from CCD 1 has its level adjusted by CDS/AGC circuit 2, and then converted into a digital signal by A/D converter 3. Here, the data amount matches the number of pixels of CCD 1. One color data corresponding to a color filter of CCD 1 is present per one pixel.

The signal output from A/D converter 3 is subjected to various processes such as pixel interpolation and matrix processing by signal processing circuit 4 to be converted into image data of Y, U and V. These image data are provided for each of all the pixels. Y corresponds to a luminance signal, and U and V correspond to two types of color difference signals.

Figure 5:
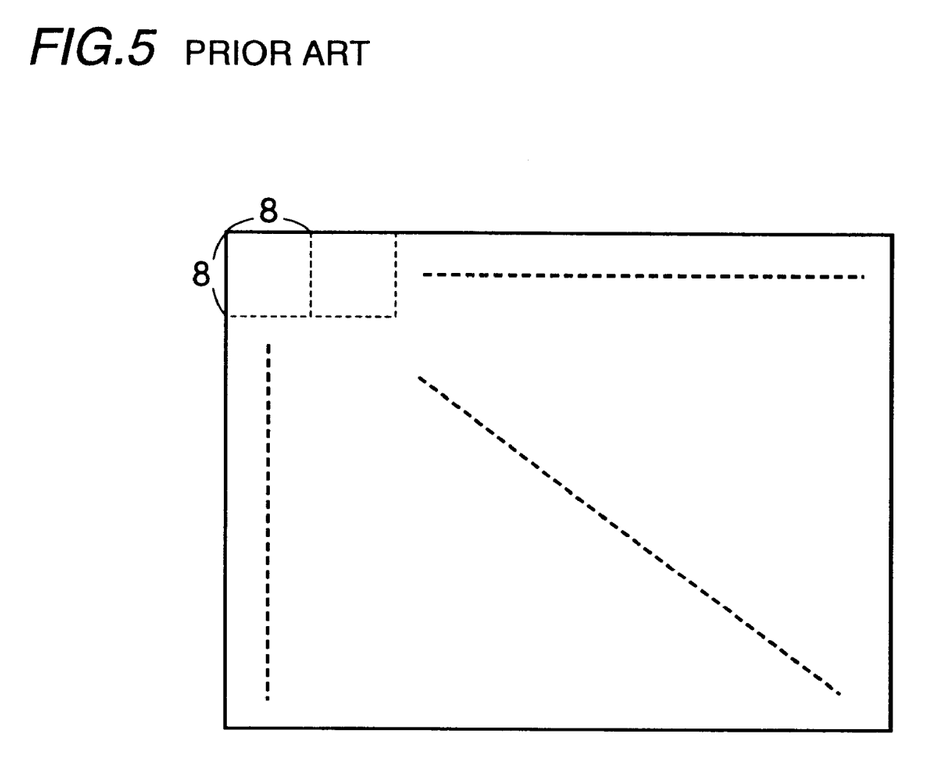
FIG. 5 is a diagram for describing an operation of an image compression circuit shown in FIG. 4.

The image data is compressed by image compression circuit 5 and recorded into image memory 6. When the JPEG system, for example, is employed as the compression system, the screen is divided into a plurality of blocks of 8×8 pixels as shown in FIG. 5. Data compression is carried out for each component of Y, U and V on a block-by-block basis.

In order to reproduce an image, the compressed data is read out from image memory 6. The readout data is expanded into the former Y, U and V data by image expansion circuit 7 to be written into display memory 8. Here, characters of numerics and signs are also written into display memory 8. More specifically, switch 22 is altered according to whether the monitor device complies with the NTSC method or the PAL method, whereby the appropriate NTSC character font memory 23 or PAL character font memory 24 is connected to character data set circuit 21. Character data set circuit 21 reads out the character data from the connected memory 23 or 24 to provide the read out data into display memory 8.

The image data and character data in display memory 8 are read out by display circuit 9 to be converted into analog signals by D/A converter 10. The converted analog signals are provided to LCD 11 and an external monitor device.

Figure 6:
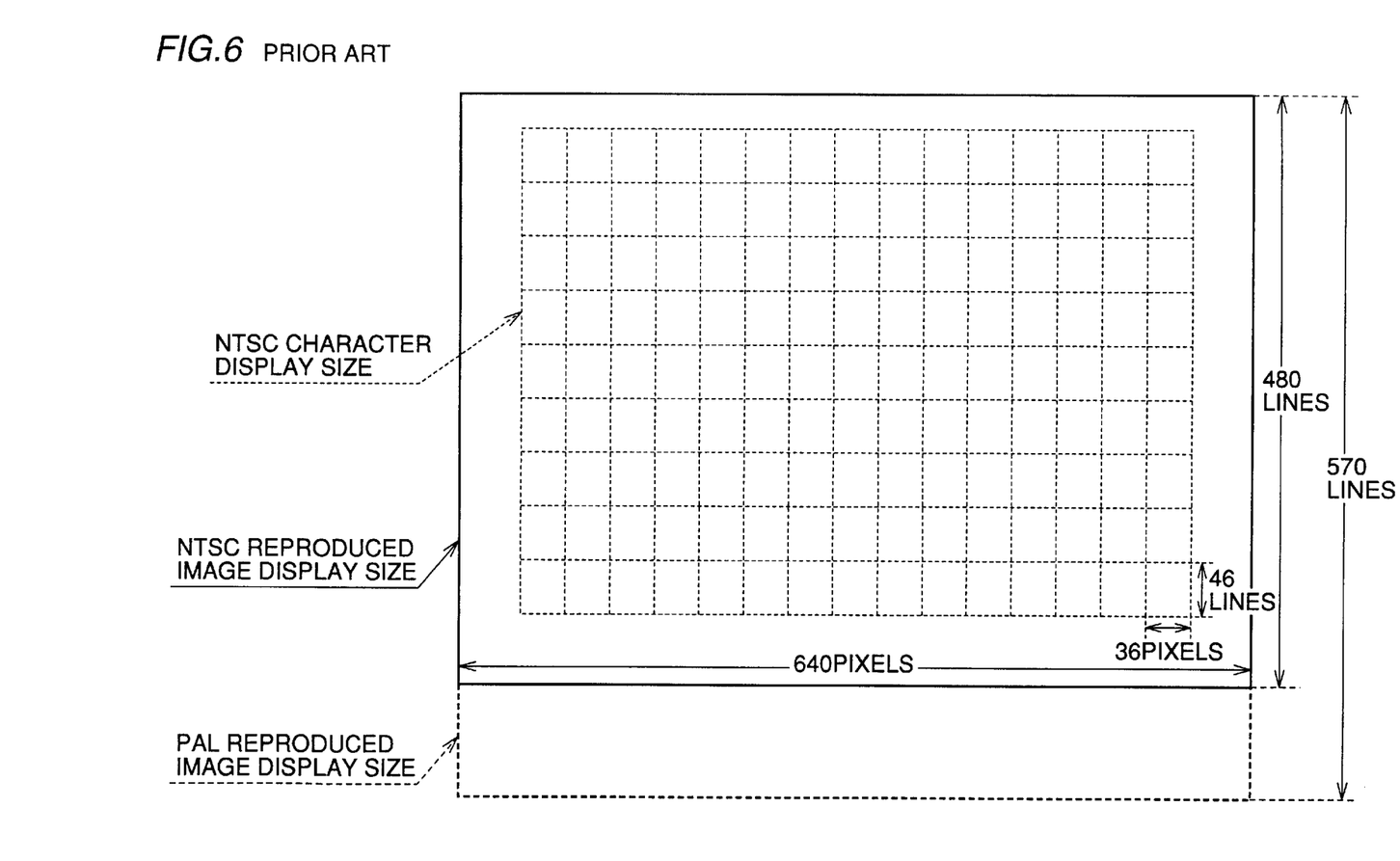
FIG. 6 is a diagram for describing a display size difference between the NTSC method and the PAL method.

Switching is provided between character font memory 23 and 24 depending upon whether the monitor device complies with the NTSC system or the PAL system because the vertical to horizontal ratio of the display screen differs depending upon the system of the monitor device. More specifically, as shown in FIG. 6, an image is formed of 480 lines in the vertical direction and 640 pixels (dots) in the horizontal direction in the NTSC system. In the PAL system, an image is formed of 570 lines in the vertical direction and 640 pixels in the horizontal direction. Therefore, an arrangement is provided so that the position of the characters in the display screen does not differ according to the system employed by the monitor device by arranging the character image formed of 46 lines×36 pixels in 9 rows and 15 columns at the middle of display screen for a monitor device of the NTSC system and a character image formed of 54 lines×36 pixels in 9 rows and 15 columns at the middle of the display screen for a monitor device of the PAL system. It is to be noted that the horizontal scanning lines are skipped in FIG. 6 although there are 525 lines and 625 lines in the vertical direction in the NTSC system and the PAL system, respectively.

The operation of character display will be described in detail hereinafter. Data which are designs of character fonts for NTSC and PAL are respectively prepared in advance for character font memories 23 and 24. In the present specification, the operation of providing a character display on a monitor device according to the NTSC method will be described.

Figure 7:
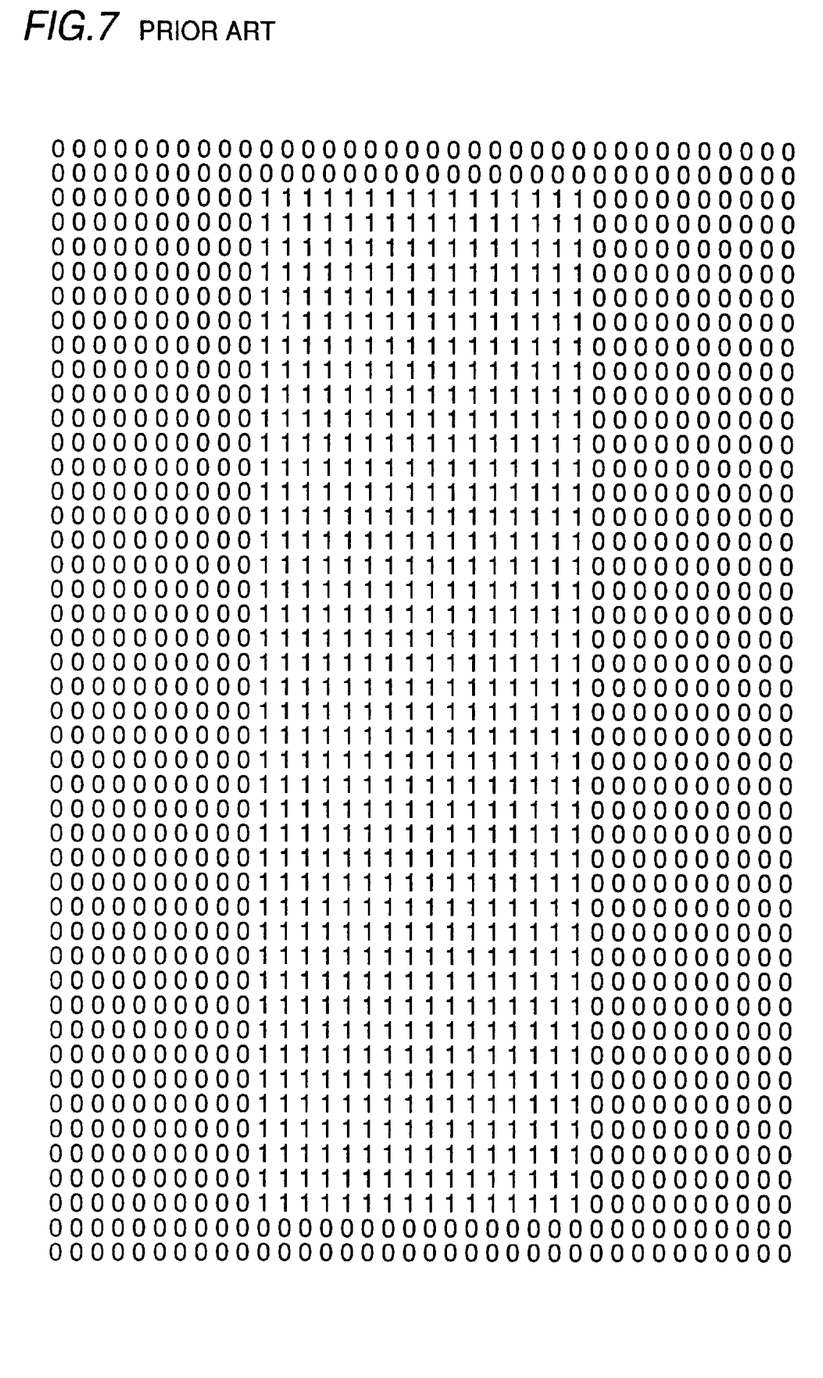
FIG. 7 shows an example of font data stored in the NTSC character font memory of FIG. 4.
Figure 8:
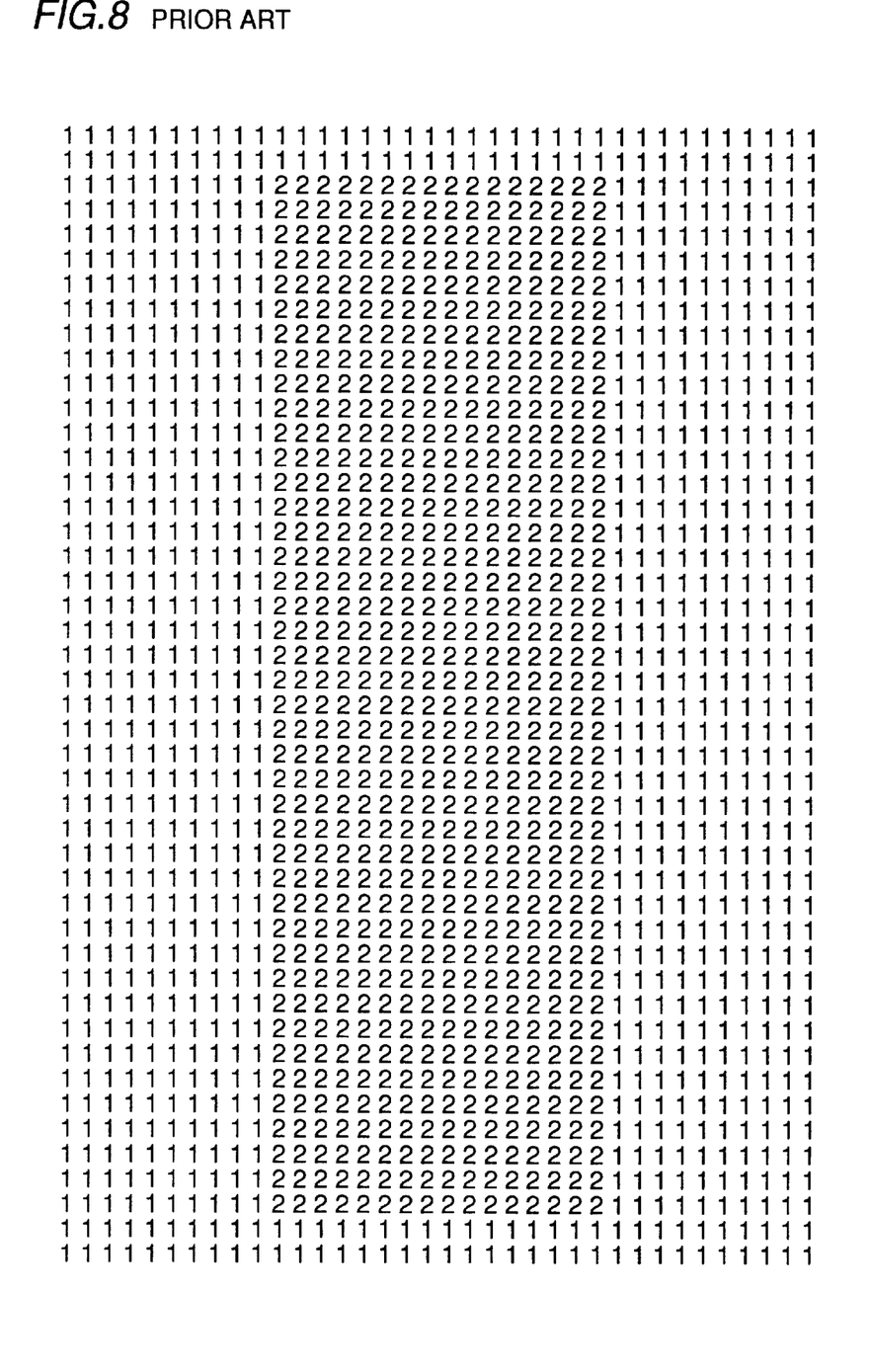
FIG. 8 shows a character displayed according to the font data of FIG. 7.

In order to display a character on the basis of two colors such as white for the character itself and black for the background, font data as shown in FIG. 7 is prepared. This example of FIG. 7 shows the display of the alphabet letter "I" in 36 pixels×46 lines. By providing a display of black for the pixel of 0 and white for the pixel of 1 in FIG. 7, a white character "I" is formed within a black rectangle. This image is sequentially read out starting from the leftmost upper pixel to the bottom rightmost pixel into predetermined addresses of display memory 8. More specifically, 1 (01) and 2 (10) are written into the predetermined addresses of display memory 8 when character data=0 and character data=1, respectively, as shown in FIG. 8.

In order to write both image data of Y, U and V data and character data into display memory 8, 8 bits are allotted for Y data and 6 bits are allotted for each of U and V data. The character data of 1 or 2 is written into the least significant 2 bits of each U and V data. The image and character data for one screen are recorded as described above into display memory 8.

Figure 9:
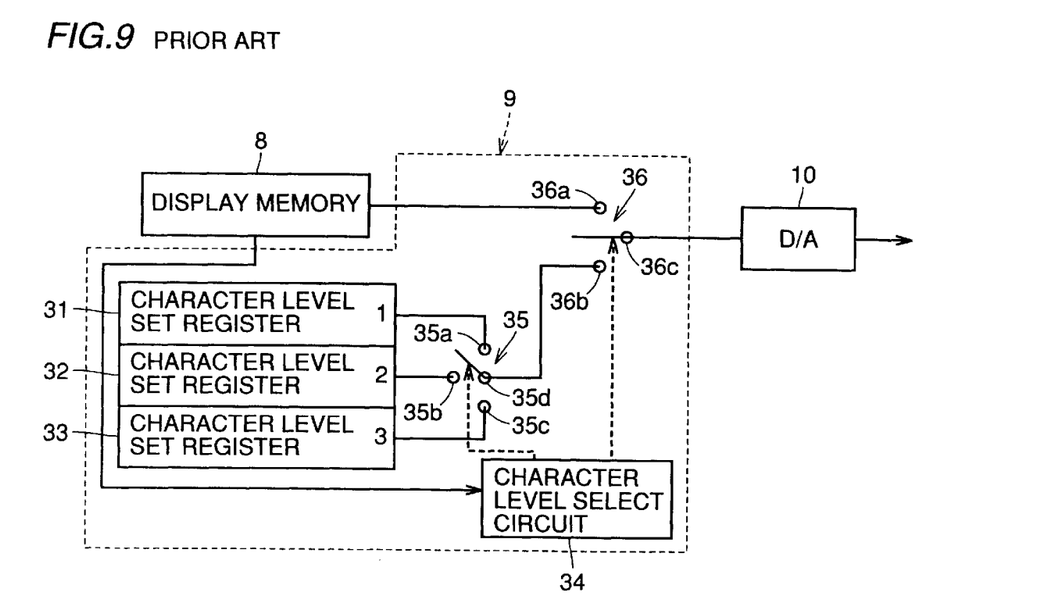
FIG. 9 is a circuit block diagram showing a structure of a display circuit of FIG. 4.

As shown in FIG. 9, display circuit 9 includes character level set registers 31–33, a character level select circuit 34, and switches 35 and 36. Character level set registers 31–33 provides levels 1–3 corresponding to the color to be displayed by respective pixels. The three switch terminals 35a–35c of switch 35 receive the outputs from character level set registers 31–33, respectively. Switch 36 has one switch terminal 36a receiving the output of display memory 8 and the other switch terminal 36b connected to a common terminal 35d of switch 35. A common terminal 36c of switch 36 is connected to D/A converter 10. Switches 35 and 36 are controlled by character level select circuit 34.

The character data corresponding to the leasts significant 2 bits of each U and V data in display memory 8 takes four types of values from 0–3 including the above-described 1, 2. When character data is 0, connection across terminals 36a and 36c of switch 36 is established so that the background image data in display memory 8 is applied to D/A converter 10. When character data is 1–3, the connection across terminals 36b and 36c of switch 36 is established, so that the outputs of character level set registers 31–33 are applied to D/A converter 10. By presetting the relationship between the output level and the color of the pixel such as a black level for output level 1 of register 31 and a white level for output level 2 of register 32, a display of a character such as that shown in FIG. 7 can be provided.

Although the above description is provided for character display on a NTSC system monitor device, similar character display can be achieved on a PAL monitor device by writing character data into display memory 8 according to the data of PAL character font memory 24 shown in FIG. 4.

The conventional digital still camera had the disadvantage that a relatively large memory capacity is required since two types of character fonts for both the NTSC and PAL systems have to be prepared.

SUMMARY OF THE INVENTION

In view of the foregoing, a main object of the present invention is to provide an image recording and reproduction apparatus that can provide character display on a display screen of two systems with a small memory capacity.

According to an aspect of the present invention, an image recording and reproduction apparatus has character image read out from a memory device directly provided on a display screen when in a first display mode and has the number of dots in the vertical direction of the character image read out from the memory device increased and then provided on a display screen when in a second display mode. It is therefore not necessary to provide separate character images for the first display mode and for the second display mode. The capacity of the memory device can be reduced.

Preferably, the ratio of the number of dots in the vertical direction of a character image displayed in the first and second display modes is equal to the ratio of the number of horizontal scanning lines in the first and second display modes. Therefore, the character image can be provided on a display screen at the same position in the first and second display modes.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Before describing an embodiment of the present invention, the principle of the present invention will first be described. As shown in FIG. 6, there are 480 horizontal scanning lines in the NTSC system and 570 horizontal scanning lines in the PAL system. By displaying one character in 46 lines and in 46×570/480≠54 lines when the monitor device complies with the NTSC system and the PAL system, respectively, the character display will be identical under both systems.

In the present invention, only a character font memory 23 for the NTSC in which one character is formed of 46 lines is provided. When the monitor device complies with the PAL system, data identical to one preceding line is written into display memory 8 for every 5 lines. Therefore, one character can be displayed in 54 lines which is an increase of 8 lines in the vertical direction per one character. Thus, the two display systems can be accommodated by one memory 23. The total memory capacity can be reduced less than that of the conventional case where two memories 23 and 24 are required.

The above-described technique will induce no unnatural appearance since a character display is originally an artificial one differing from an image display. The details of the present invention will be described hereinafter with reference to the drawings.

Figure 1:
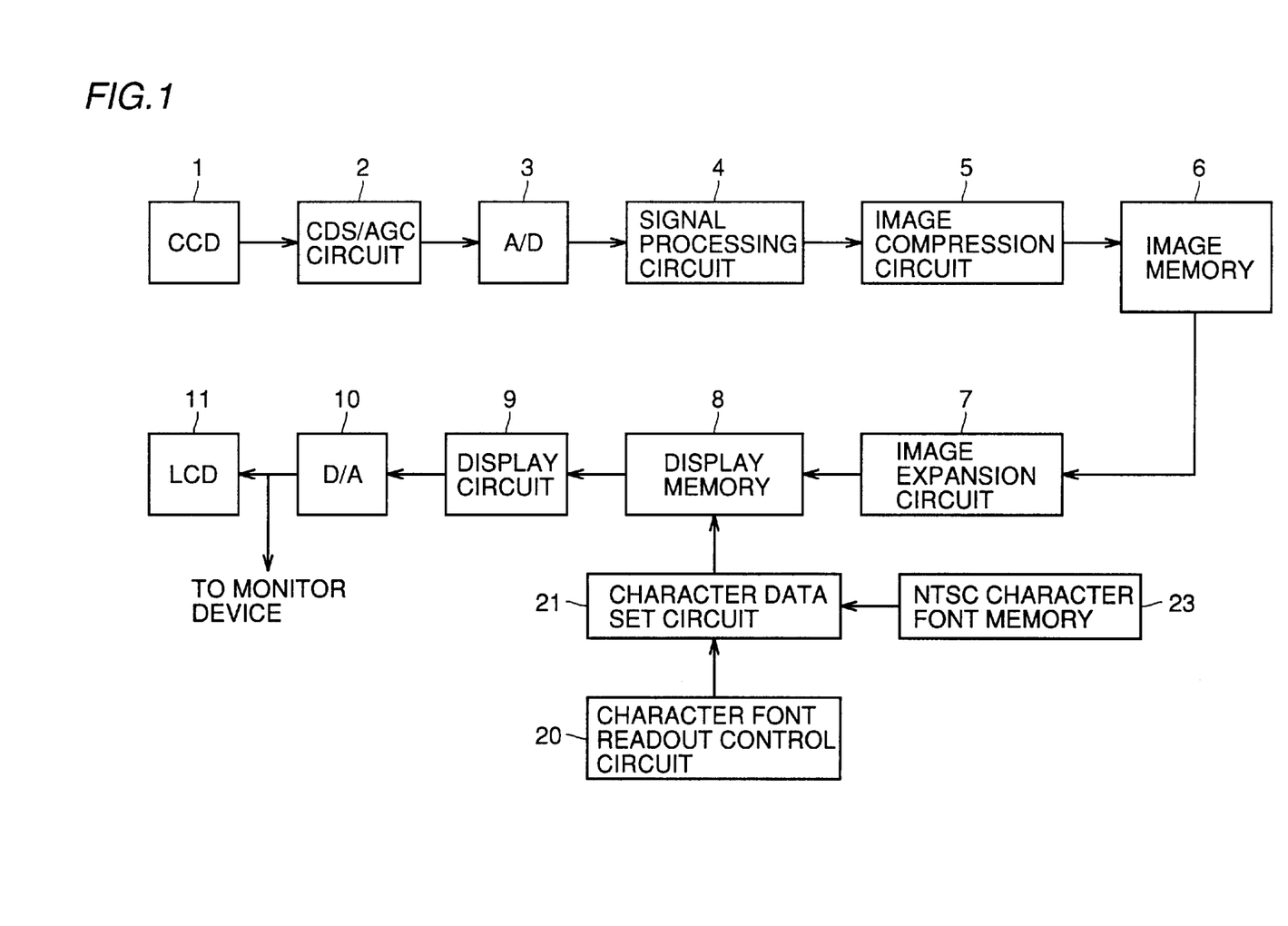
FIG. 1 is a block diagram showing a structure of a digital still camera according to a first embodiment of the present invention.

FIG. 1 is a circuit block diagram showing a structure of a digital still camera according to an embodiment of the present invention. The digital still camera of the present invention differs from the conventional digital still camera of FIG. 4 in that switch 22 and PAL character font memory 24 are removed, and that a character font readout control circuit 20 is newly provided. When the monitor device complies with the NTSC system, character font readout control circuit 20 controls character data set circuit 21 so that the character data in NTSC character font memory 23 is written into display memory 8 as in the conventional manner. When the monitor device complies with the PAL system, character font readout control circuit 20 controls character data set circuit 21 so that 5 lines of character data are written into display memory 8, and then the character data of the fifth line is written again into the sixth line of display memory 8.

Figure 2:
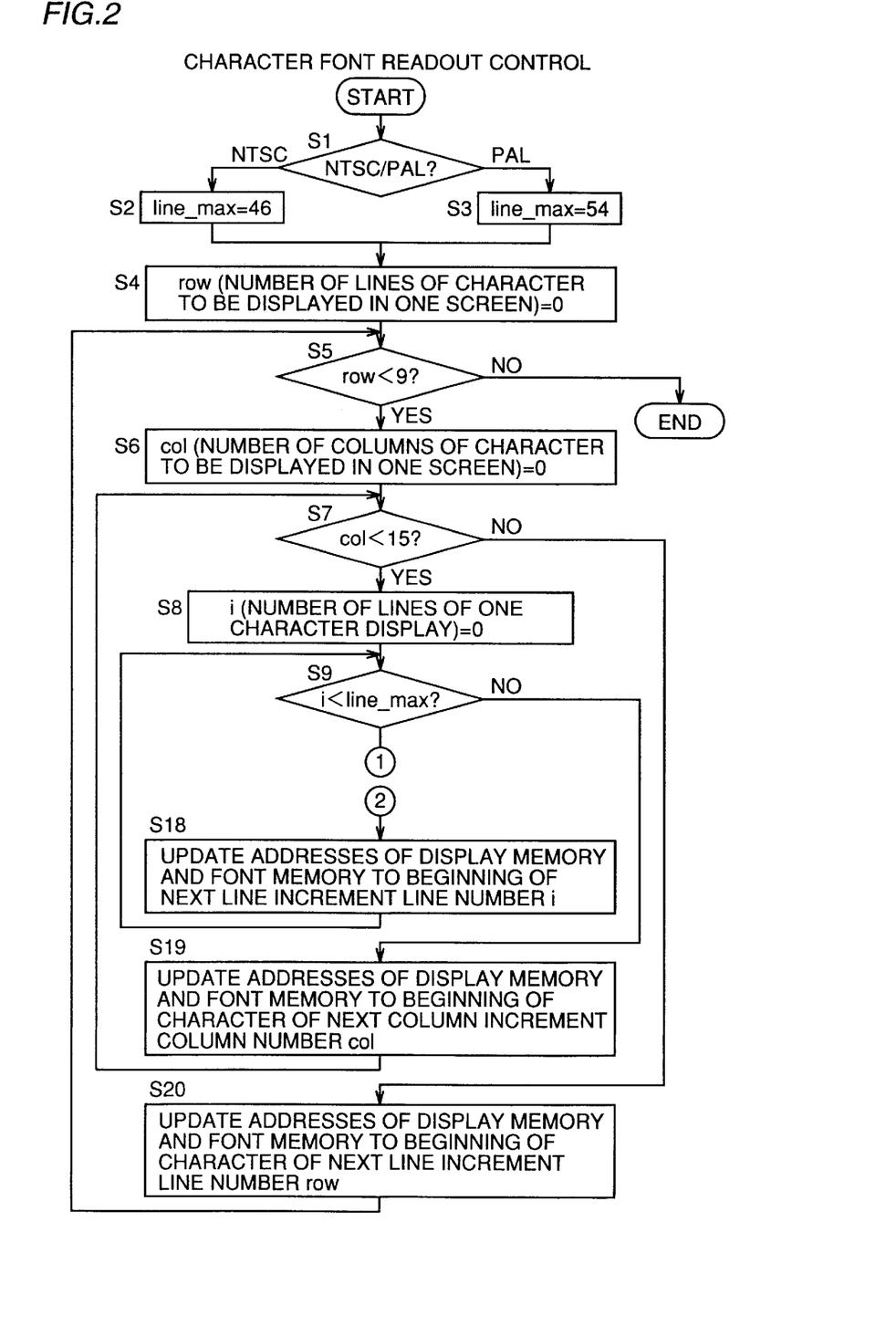
FIGS. 2 and 3 are flow charts showing the former half and latter half, respectively, of the processing operation of a character font readout control circuit of FIG. 1.
Figure 3:
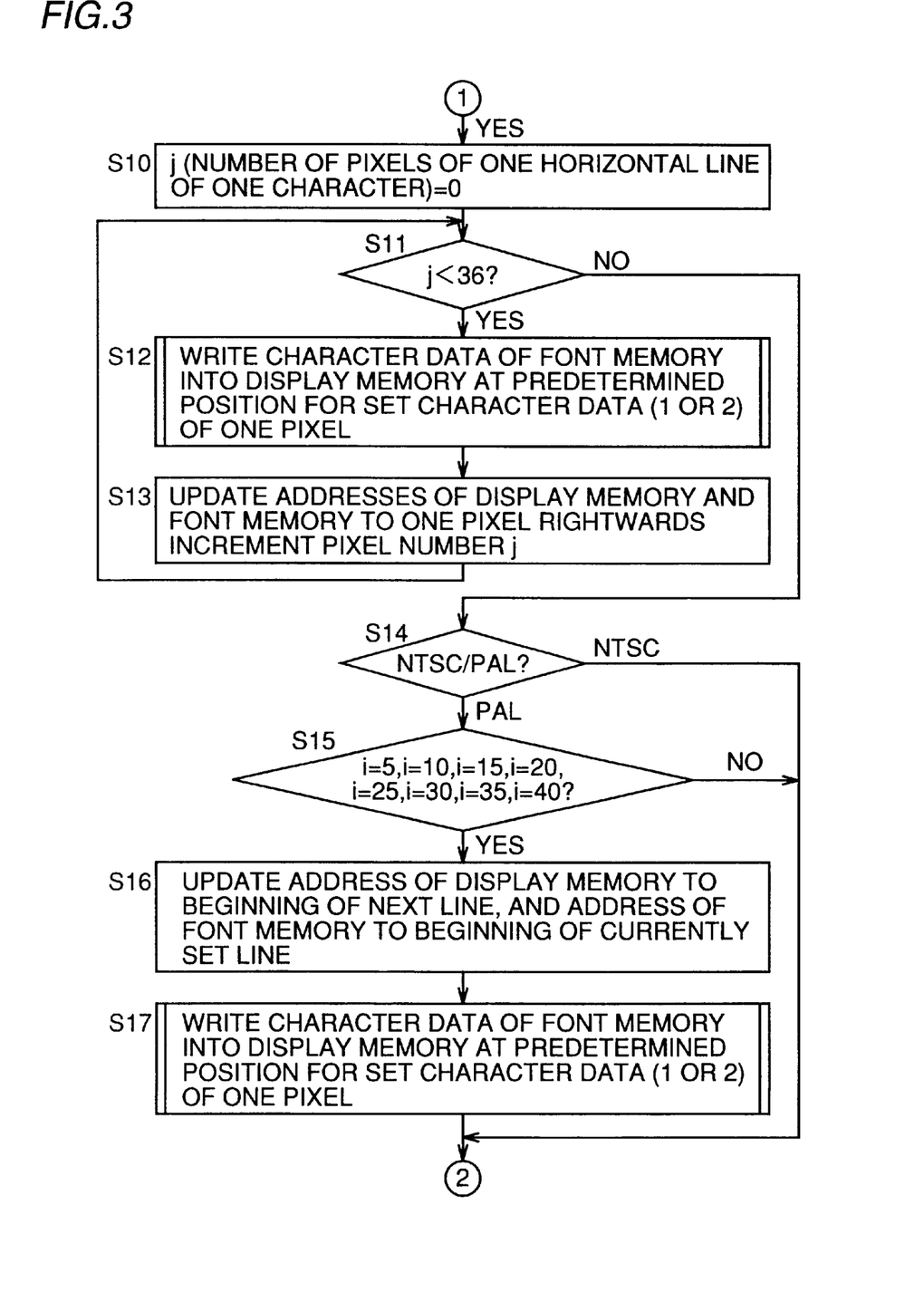

This control will be described in detail with reference to the flow charts of FIGS. 2 and 3. At step S1, character font readout control circuit 20 determines whether the monitor device connected to the digital still camera complies with the NTSC system or the PAL system. When in the NTSC system, the control proceeds to step S2 where the number of lines "line_max" forming a character is set to 46. When in the PAL system, control proceeds to step S3 to set the number of lines "line_max" forming a character to 54.

At step S4, character font readout control circuit 20 sets the number of lines "row" of the character to be displayed in one screen to 0. At step S5, determination is made whether the value of "row" is smaller than 9 or not. When "row" is not smaller than 9, the operation ends. When "row" is smaller than 9, control proceeds to step S6.

At step S6, character font readout control circuit 20 sets the number of columns "col" of the character to be displayed in one screen to 0. At step S7, determination is made whether the value of "col" is smaller than 15. When "col" is not smaller than 15, i.e. col=15, the control proceeds to step S20 where the addresses of display memory 8 and font memory 23 are updated to the beginning of the character of the next row. Then, the value of "row" is incremented (+1), and control returns to step S5. When determination is made that "col" is smaller than 15 at step S7, the control proceeds to step S8.

At step S8, character font readout control circuit 20 sets the number of lines "i" of one character to 0. At step S9, determination is made whether the value of "i" is smaller than line_max. When the value of "i" is not smaller, i.e., i=line_max, the control proceeds to step S19 where the addresses of display memory 8 and font memory 23 are updated to the beginning of the character of the next column. Then, the value of "col" is incremented (+1), and the control returns to step S7. When the number of lines "i" is found to be smaller than the value of line_max at step S9, the control proceeds to step S10.

At step S10, character font readout control circuit 20 sets the number of pixels of a horizontal line in one character to 0. At step S11, determination is made whether the number of pixels "j" is smaller than 36. When YES, control proceeds to step S12 where the character data of font memory 23 is written into display memory 8 at a predetermined address under control of character data set 21. At step S13, the addresses of display memory 8 and font memory 23 are updated to one pixel rightwards, and the number of pixels "j" is incremented (+1). Then, control returns to step S11.

When character font readout control circuit 20 determines that the number of pixels "j" is not smaller than 36, i.e., number of pixels j=36 at step S11, control proceeds to step S14 where determination is made whether the monitor device complies with the NTSC system or the PAL system. When in the NTSC system, the control proceeds to step S18 where the addresses of display memory 8 and font memory 23 are updated to the beginning of the next line. Then, the number of lines "i" is incremented by 1 (+1), and control returns to step S9.

When character font readout control circuit 20 determines that the monitor device complies with the PAL system at step S14, control proceeds to step S15 where determination is made whether the line number is any of 5, 10, 15, 20, 25, 30, 35, and 40, i.e. whether "i" is a multiple of 5. When NO, control proceeds to step S18. When the value of "i" is a multiple of 5, the control proceeds to step S16 where the address of display memory 8 is updated to the beginning of the next line and the address of font memory 23 is updated to the beginning of the currently set line. At step S17, the character data in font memory 23 is written into display memory 8 at a predetermined position under control of character data set circuit 21.

The remaining structure and operation are similar to those of a conventional case, and their description will not be repeated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording and reproduction apparatus having a first display mode which displays an image on a first display screen having a first number of horizontal scanning lines, a second display mode which displays an image on a second display screen having a second number of horizontal scanning lines, said second number being grater than said first number, and a character display mode which displays a character image on a display screen, said image recording and reproduction apparatus comprising:

a memory which stores a first character image constituted by a plurality of dots arranged in a plurality of rows and columns;

a readout unit which reads out said first character image from said memory by sequentially reading out a plurality of dot lines included in said first character image one at a time according to a designation of said character display mode during said first display mode;

a character image generation unit which generates a second character image having a greater number of dot lines, than a number of dot lines of said first character image by a predetermined number, by repeating a readout process of selecting a plurality of n dot lines (where n is a predefined integer) continuously arranged out of the plurality of dot lines included in said first character image to sequentially read out n-1 dot lines one at a time and reading one dot line two times according to the designation of said character display mode during said second display mode; and a character image supply unit to display on said first display screen said first character image read out by said readout unit when said character display mode is designated during said first display mode, and display n said second display screen said second character image generated by said character image generation unit when said character display mode is designated during said second display mode.

2. The image recording and reproduction apparatus according to claim 1, wherein a ratio of the number of dot lines in said first character image to the number of dot lines in said second character image is substantially equal to a ratio of said first number to said second number.

* * * * *